United States Patent [19]

Kervagoret

[11] Patent Number: 5,086,688

[45] Date of Patent: Feb. 11, 1992

[54] HYDRAULIC BOOSTER DEVICE WITH VALVE MEANS FOR DAMPING OF INPUT ROD

[75] Inventor: Gilbert Kervagoret, Drancy, France

[73] Assignee: Bendix Europe Services Techniques, Drancy, France

[21] Appl. No.: 639,844

[22] Filed: Jan. 11, 1991

[30] Foreign Application Priority Data

Jan. 31, 1990 [FR] France ................... 90 01118

[51] Int. Cl.⁵ .................. F15B 11/08; F15B 13/04; B60T 15/04
[52] U.S. Cl. ......................... 91/440; 91/443; 60/533; 60/574; 60/591
[58] Field of Search ............... 60/533, 574, 583, 591, 60/594; 91/31, 440, 443; 188/282, 316, 317

[56] References Cited

U.S. PATENT DOCUMENTS

| 2,814,364 | 11/1957 | Lowe ................ 60/533 X |
| 3,168,812 | 2/1965 | Randol ............... 60/591 X |
| 4,278,009 | 7/1981 | Demido .............. 91/434 X |
| 4,428,567 | 1/1984 | Fournales ........... 188/317 X |
| 4,475,635 | 10/1984 | Iwata et al. ........... 188/282 |
| 4,558,767 | 12/1985 | Taylor ................ 188/282 |
| 4,588,054 | 5/1986 | LaBaron ............ 188/282 X |
| 4,656,924 | 4/1987 | Chatterjea ......... 188/316 X |
| 4,858,438 | 8/1989 | Douillet et al. . |
| 4,938,324 | 7/1990 | Van Dyke ........... 188/282 X |
| 4,998,950 | 3/1991 | Derrick .............. 60/533 X |

FOREIGN PATENT DOCUMENTS

| 0288349 | 10/1988 | European Pat. Off. . |
| 2164879 | 8/1973 | France . |
| 2391884 | 12/1978 | France . |
| 2407846 | 6/1979 | France . |

Primary Examiner—Edward K. Look
Assistant Examiner—John Ryznic
Attorney, Agent, or Firm—Larry J. Palguta; Ken C. Decker

[57] ABSTRACT

The hydraulic booster device for a brake circuit, comprises a body (30) pierced with a bore (32), in which slide coaxially a pusher (25) controlled by a brake pedal and a piston means (34) located between first (5) and second (33) chambers containing a brake fluid, the first chamber (5) receiving at least one spring (51, 52) which loads the pusher (25) and the piston means (34) away from one another, the first (5) and second (33) chambers being connected respectively to sources of fluid under low pressure (11) and under high pressure (13) by valve mechanism (15). An auxiliary chamber (4) of a volume variable as a function of the position of the pusher (25m), made in the bore (32), communicates with the first chamber (5), on the one hand permanently by way of a restriction (6) and on the other hand by an auxiliary valve mechanism (3) allowing communication during an increased in the volume of the auxiliary chamber (4) and preventing it during a reduction of the latter.

8 Claims, 4 Drawing Sheets

HYDRAULIC BOOSTER DEVICE WITH VALVE MEANS FOR DAMPING OF INPUT ROD

BACKGROUND OF THE INVENTION

The present invention relates to hydraulic booster devices for the brake circuit of motor vehicles.

Such a device is described, for example, in U.S. Pat. No. 4,858,438, to which reference will be made as regards its functioning.

It is known that such a device comprises a body pierced with a bore, in which slide coaxially a pusher controlled by a brake pedal and a piston means located between first and second chambers containing a brake fluid, the first chamber receiving at least one spring which loads the pusher and the piston means away from one another, the first and second chambers being connected respectively to sources of fluid under low pressure and under high pressure by valve means.

The spring provided in the first chamber constitutes a stroke simulator for the pedal which is generally connected to the pusher by means of a mechanism forming a lever.

When the pedal is depressed, the spring of the first chamber is compressed. The energy accumulated in this spring is restored when the driver releases his force on the pedal.

If he releases this force gently, the return movement of the pusher is damped by the driver's foot. In contrast, if the driver simply releases his force suddenly, for example by sliding his foot off the pedal, the energy accumulated in the spring will be transmitted abruptly, in the form of kinetic energy, to the pusher/pedal/mechanism assembly forming a lever, and this will have to be absorbed by the mechanical connections between these components.

In some cases, this can cause damage to or destruction of these connections.

SUMMARY OF THE INVENTION

An object of the invention is, therefore, to overcome this disadvantage by ensuring a damping of the return movement of the assembly, without abnormally changing the brake-release time or adversely affecting the feeling received by the driver.

To achieve this, according to the invention, an auxiliary chamber of a volume variable as a function of the position of the pusher, formed in the bore, communicates with the first chamber, on the one hand permanently by means of a restriction and on the other hand by an auxiliary valve means allowing communication during an increase in the volume of the auxiliary chamber and preventing it during a reduction of the latter.

BRIEF DESCRIPTION OF THE DRAWINGS

The invention will now be described by way of example with reference to the accompanying drawings in which.

DETAILED DESCRIPTION OF THE INVENTION

Figure 1:
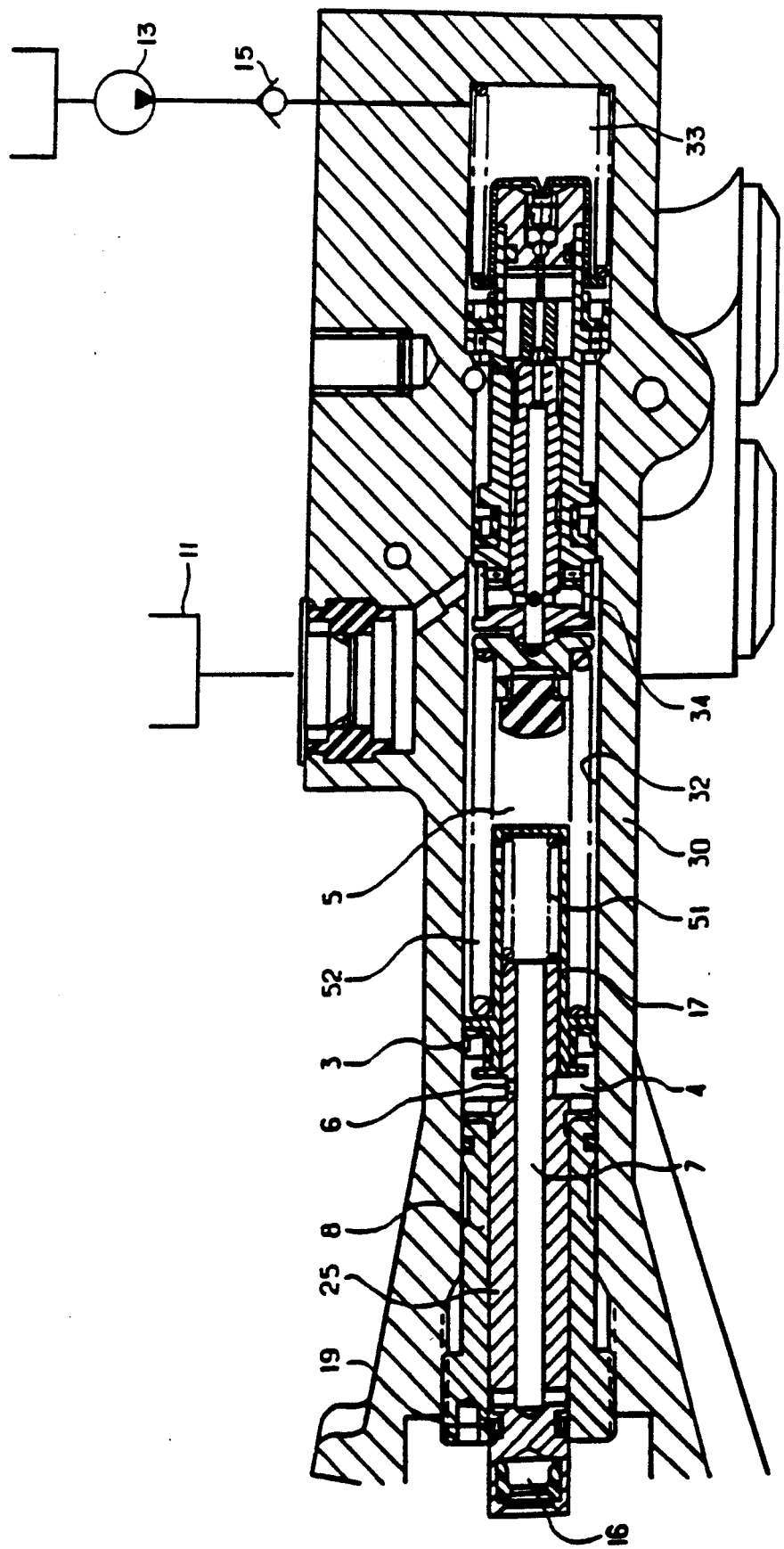
FIG. 1 shows diagrammatically, in section, a hydraulic booster device for a brake circuit according to a first embodiment.

Referring now to the Figures, these do not show the hydraulic booster device in its entirety, the complete description of this being the subject of the above-mentioned document. The part illustrated is the part essential to the invention.

The device comprises a body 30 pierced with a bore 32, in which a pusher 25 and a piston 34 slide coaxially. The brake pedal (not shown) is fastened to that end 16 of the pusher 25 which projects from the bore 32.

In the examples shown, two springs 51 and 52 arranged in the first chamber 5 push the piston 34 and the pusher 25 away from one another. A plug 8 forms a stop inside the bore 32 for the pusher 25. The pusher 25 is equipped with a blind drillhole 7 communicating with the first chamber 5. The first chamber 5 is connected to a source of fluid under low pressure of reservoir 11 and the second chamber 33 is connected to a source of fluid under high pressure 13 by valve means 15.

Figure 2:
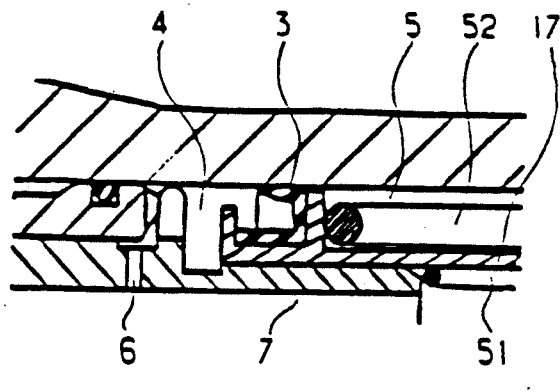
FIGS. 2 and 3 illustrate diagrammatically, in an enlarged part view, two alternative versions of the embodiment shown in FIG. 1.
Figure 3:
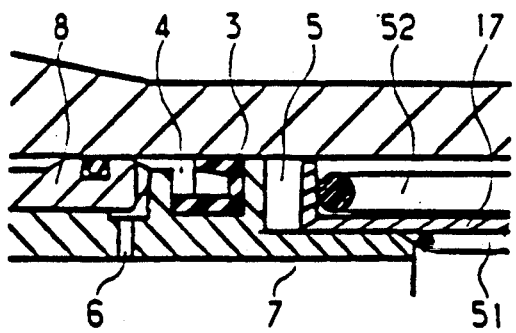

Referring to FIGS. 1 to 3, an auxiliary chamber 4 is made between the pusher 25 and the bore 32 and communicates with the first chamber 5 by means of an orifice 6 and the drilhole 7.

A one-way seal or gasket 3 is fastened to the pusher 25 and separates the auxiliary chamber and the first chamber 5.

This seal or gasket 3 is an elastic cup, the lip of which is located in the auxiliary chamber 4.

Since the embodiment illustrated comprises two compression springs for simulating the stroke of the pedal according to two different laws, the gasket 3 can equally be fastened either directly to the pusher 25, as shown in FIG. 3, or indirectly by means of a cylinder 17 forming the intermediate piece between the two springs 51, 52, as shown in FIG. 2, depending on the type of damping desired.

The device functions as follows.

At rest, the chamber 5 is filled with brake fluid under low pressure. When the pedal is depressed, the pusher 25 slides to the right (in the Figures), first compressing the spring 51 and the spring 52, the rigidities of which are generally different, until the components come up against one another. A vacuum is generated in the auxiliary chamber 4. The fluid of the chamber 5 then passes via the drillhole 7 and the orifice 6 in order to enter the auxiliary chamber 4, the volume of which increases. The lip of the cup 3 moves away, thereby providing an additional path for the flow of fluid towards the chamber 4. The feeling received by the driver at the pedal is therefore not adversely affected.

When the driver releases his force on the brake pedal, the energy accumulated in the springs 51, 52 tends to return the pusher 25 into its rest position shown. However, the brake fluid trapped in the auxiliary chamber 4 slows the return movement of the pusher 25. In fact, the cup 3 is then sealing and prevents any flow of fluid from the auxiliary chamber 4 towards the first chamber 5. The fluid therefore has to escape via the orifice 6 which forms a restriction, the diameter of which determines the return time of the pusher.

Since the return of the pusher is slowed in this way, the mechanical connections between the pusher and the pedal are not subjected to violent shocks, thus preventing them from being damaged.

Figure 4:
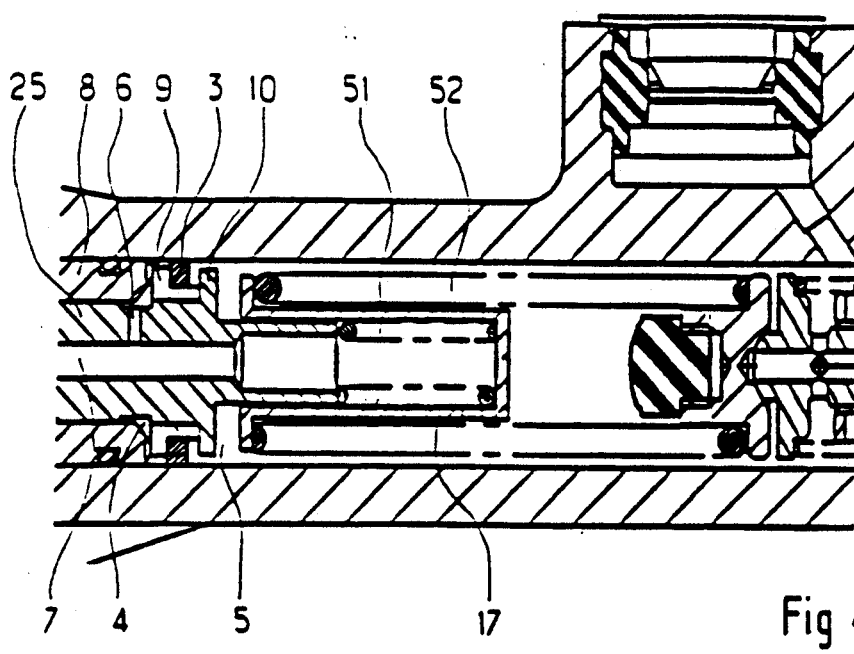
FIG. 4 shows diagrammatically, in section, a device according to a second embodiment of the invention.

The embodiment of FIG. 4 differs from that of FIGS. 1 to 3 in the type of one-way seal or gasket used. In fact, in FIGS. 4 and 5, this gasket consists of an annular segment 3 gripped in the bore 32 and mounted in a floating manner between two stops 9 and 10 provided on the periphery of the pusher 25. The stop 9 located adjacent the chamber 4 is pierced so as to provide passages for the brake fluid, whereas the stop 10 located adjacent the chamber 5 is solid.

During the movement of the pusher to the right (in the Figure), the gasket 3 bears against the pierced stop 9, thereby providing a passage for the brake fluid between the chamber 5 and the chamber 4 by way of the space left free between the end of the stop 10 and the bore 32. During the return of the pusher, the gasket 3 bears against the solid stop 10, thus closing the above-mentioned space and preventing any flow of fluid between the chambers 4 and 5 by this path. The fluid then has to pass via the orifice 6 which forms the above-mentioned restriction.

Figure 6:
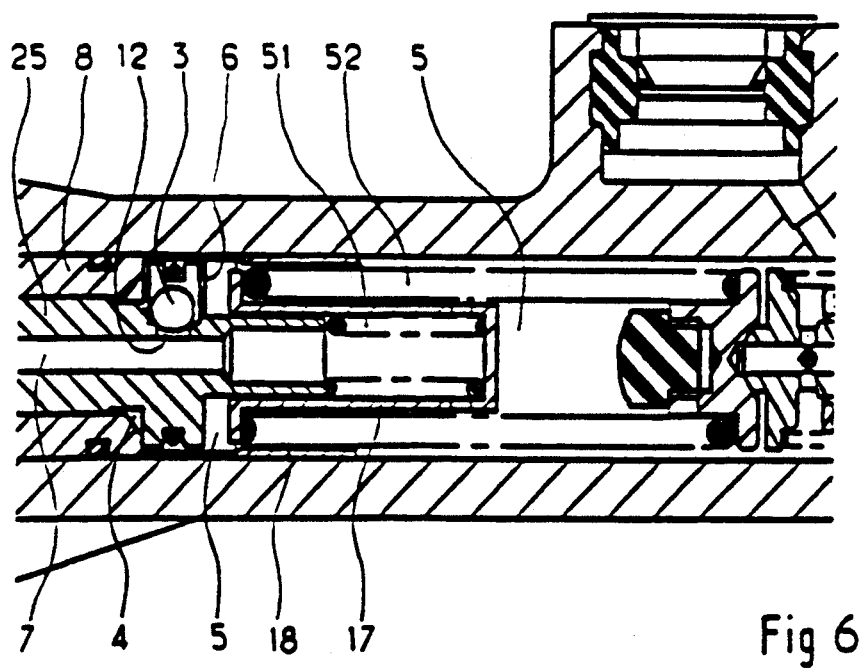
FIG. 6 shows diagrammatically, in section, a device according to a third embodiment of the invention.
Figure 7:
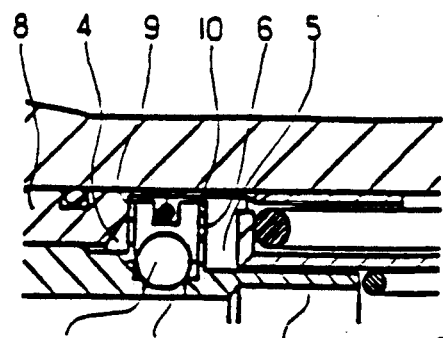
FIG. 7 illustrates, in an enlarged part view, a detail of the embodiment shown in FIG. 6.

The embodiment illustrated in FIGS. 6 and 7 likewise differs from the preceding ones, particularly in the one-way seal or gasket used. In fact, in FIGS. 6 and 7, the gasket 3 consists of a ball which, at rest, closes an aperture 12 formed between the chamber 4 and the duct 7. When the pusher 25 is moved to the right (in the Figure), the ball 3 lifts and the fluid enters the chamber 4. A cage 9, 10 is carefully formed in the pusher 25 in order to guide the ball. During the return of the pusher, the ball 3 is pushed on to its seat as a result of the pressure in the chamber 4 and closes the aperture 12, preventing any flow of fluid by this path. The fluid therefore has to circulate via the orifice 6 and the space between the stop 10 and the inner wall of the chamber, which together form the above-mentioned restriction.

In the example illustrated, the orifice 6 is made in a wall 10 of the ball cage, but it could have been made according to the teachings of the preceding Figures.

The example shown in FIGS. 6 and 7 likewise differs from the preceding ones, in that the plug 8 is equipped with a skirt 18, the auxiliary chamber 4 then being defined peripherally by this skirt 18 projecting from the plug 8 towards the inside of the device. By changing the thickness of this skirt 18, the value of the restriction is changed, and it is therefore possible to vary the return speed of the pusher according to its position.

Figure 8:
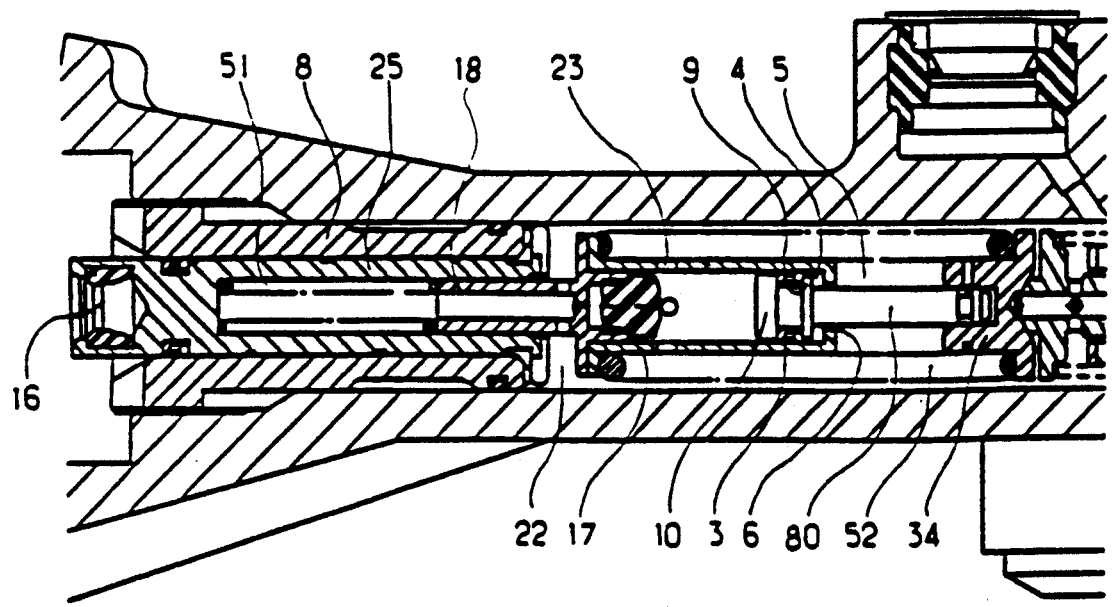
FIG. 8 shows diagrammatically, in section, a device according to a fourth embodiment of the invention.

The embodiment shown in FIG. 8 is somewhat different from the preceding ones, in that the auxiliary chamber is located on the inside of the first chamber 5, the two springs 51 and 52 being aligned and not one in the middle of the other. The piston 34 is equipped with a rod 80, the free end 10 of which penetrates into a cylinder 17 connected to the pusher 25, here by means of an intermediate piece 18 arranged between the two springs. The volume between the intermediate piece 18 and the free end 10 of the rod 80 communicates with the first chamber 5 by means of drillholes 23.

A one-way seal or gasket 3 is arranged at the free end of the rod 80, so as to allow a flow of fluid when the pusher 25 moves to the right (in the Figure) and prevents the reverse flow during the return of the pusher.

At that moment, only the space 6 available between the wall of the rod 80 and the free end of the cylinder determines a path for the flow of fluid escaping from the chamber 4 towards the chamber 5 and forms the restriction.

Figure 5:
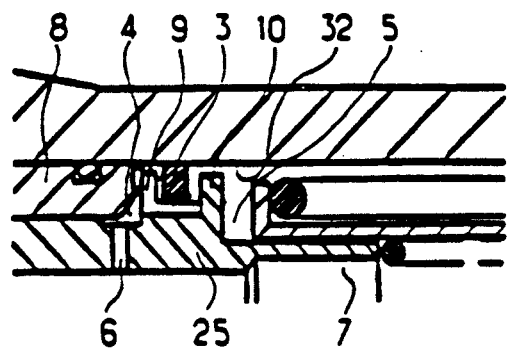
FIG. 5 illustrates, in an enlarged part view, a detail of the embodiment shown in FIG. 4.

In the example illustrated, the gasket 3 is of the elastic cup type, such as that used in the embodiment of FIGS. 1, 2 and 3, but it could just as well be of the floating segment type, as used in the embodiment of FIGS. 4 and 5.

It should be noted that, in the example shown in FIG. 8, only the movement attributable to the energy accumulated in the spring 52 is damped.

Of course, an average person skilled in the art can make many modifications to the present invention, without departing from the scope of the invention, as defined by the accompanying claims.

What we claim is:

1. A hydraulic booster device for a brake circuit, comprising a body having a bore in which slide coaxially a pusher controlled by a brake pedal and piston means located between first and second chambers containing brake fluid, the first chamber receiving at least one spring which loads the pusher and the piston means away from one another, the first and second chambers bring connected respectively to sources of fluid under low pressure and under high pressure by valve means, and an auxiliary chamber of a volume variable as a function of the position of the pusher and located in said bore, the auxiliary chamber communicating with said first chamber permanently by means of a restriction and by auxiliary valve means for allowing communication during an increase in the volume of the auxiliary chamber and preventing communication during a reduction of volume of the auxiliary chamber.

2. The device according to claim 1, wherein said auxiliary chamber is an annular chamber between said pusher and the bore and is separated from said first chamber by a one-way seal.

3. The device according to claim 2, wherein the one-way seal comprises a ball seated in said auxiliary chamber and capable of closing a duct made between the first chamber and the auxiliary chamber.

4. The device according to claim 2, wherein the one-way seal is an elastic cup, the lip of which is located in said auxiliary chamber.

5. The device according to claim 2, wherein the one-way seal is an annular segment engaging a surface of said bore and floating between two stops provided on the periphery of said pusher between the first chamber and the auxiliary chamber, the stop located adjacent the auxiliary chamber being pierced, whereas the stop located adjacent the first chamber is solid.

6. The device according to claim 1, wherein said auxiliary chamber is inside the first chamber and is determined by a volume provided between a rod sliding in a cylinder, the rod and cylinder being fastened one to the piston and the other to the pusher, a free end of the rod carrying a one-way seal, and a space between a free end of the cylinder and a wall of the rod forming said restriction.

7. The device according to claim 6, wherein the one-way seal is an elastic cup, the lip of which is located in said auxiliary chamber.

8. The device according to claim 6, wherein the one-way seal is an annular segment engaging a surface of said cylinder and floating between two stops provided on the periphery of said rod between the first chamber and the auxiliary chamber, the stop located adjacent the auxiliary chamber being pierced, whereas the stop located adjacent the first chamber is solid.

* * * * *